United States Patent
Reinold et al.

(10) Patent No.: US 11,065,676 B2
(45) Date of Patent: Jul. 20, 2021

(54) METHOD FOR PRODUCING CASTING MOLDS, CORES AND BASIC MOLD MATERIALS REGENERATED THEREFROM

(71) Applicant: HÜTTENES-ALBERTUS CHEMISCHE WERKE GESELLSCHAFT MIT BESCHRÄNKTER HAFTUNG, Düsseldorf (DE)

(72) Inventors: Lukas Mirko Reinold, Hannover (DE); Maria Schweinefuss, Hannover (DE); Christian Lustig, Düsseldorf (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 78 days.

(21) Appl. No.: 16/603,276

(22) PCT Filed: Apr. 5, 2018

(86) PCT No.: PCT/EP2018/058793
§ 371 (c)(1),
(2) Date: Oct. 7, 2019

(87) PCT Pub. No.: WO2018/185251
PCT Pub. Date: Oct. 11, 2018

(65) Prior Publication Data
US 2021/0107055 A1  Apr. 15, 2021

(30) Foreign Application Priority Data
Apr. 7, 2017 (DE) .................. 10 2017 107 531.3

(51) Int. Cl.
| | | |
|---|---|---|
| *B22C 1/16* | (2006.01) | |
| *B22C 1/18* | (2006.01) | |
| *B22C 1/02* | (2006.01) | |
| *B22C 9/12* | (2006.01) | |
| *B22C 5/04* | (2006.01) | |
| *B22C 5/10* | (2006.01) | |
| *B33Y 10/00* | (2015.01) | |

(52) U.S. Cl.
CPC .............. *B22C 1/188* (2013.01); *B22C 1/02* (2013.01); *B22C 1/162* (2013.01); *B22C 1/167* (2013.01); *B22C 5/04* (2013.01); *B22C 5/10* (2013.01); *B22C 9/123* (2013.01); *B33Y 10/00* (2014.12)

(58) Field of Classification Search
CPC ........... B22C 1/02; B22C 1/162; B22C 1/167; B22C 1/188
See application file for complete search history.

(56) References Cited

U.S. PATENT DOCUMENTS

| | | | |
|---|---|---|---|
| 3,203,057 A | 8/1965 | Hunt | |
| 4,233,076 A | 11/1980 | Blanc et al. | |
| 5,474,606 A | 12/1995 | Twardowska et al. | |
| 5,582,232 A | 12/1996 | Bambauer et al. | |
| 6,286,580 B1* | 9/2001 | Ward | B22C 1/2253 164/5 |
| 6,972,059 B1 | 12/2005 | Skerdi | |
| 7,022,178 B1 | 4/2006 | Steinhauser | |
| 7,770,629 B2 | 8/2010 | Weicker et al. | |
| 2010/0326620 A1 | 12/2010 | Muller et al. | |
| 2015/0129155 A1* | 5/2015 | Koch | B22C 1/162 164/16 |
| 2015/0315083 A1* | 11/2015 | Deters | B22C 1/188 164/16 |

FOREIGN PATENT DOCUMENTS

| | | |
|---|---|---|
| DE | 1190610 | 4/1965 |
| DE | 1198495 | 8/1965 |
| DE | 1558155 | 3/1970 |
| DE | 82809 | 6/1971 |
| DE | 141118 | 4/1980 |
| DE | 246488 | 6/1987 |
| DE | 102007045649 | 4/2009 |

(Continued)

OTHER PUBLICATIONS

Zhang et al., "Dendrimer-linked, renewable and magnetic carbon nanotube aerogels", Mater. Horiz., 2014, vol. 1, pp. 232-236.
"Argical-M 1200S", Jul. 24, 2008 (bilingual document French/English), 1 page.
Ramakrishnan (doctorate thesis): "3-D Drucken mit einem anorganischen Formstoffsystem", Diss. 2015 (English summary on p. 5).

*Primary Examiner* — Kevin E Yoon

(74) *Attorney, Agent, or Firm* — Duane Morris LLP; Gregory M. Lefkowitz

(57) ABSTRACT

What are described is a process for producing casting molds, cores and mold base materials regenerated therefrom, a mixture for combination with a solution or dispersion comprising waterglass for production of casting molds and/or cores, a molding material mixture, a mold base material mixture, and a casting mold or a core. What is also described is the corresponding use of an amount of particulate sheet silicates having a $d_{90}$ of less than 45 μm or a corresponding mixture as additive for production of a molding material mixture comprising waterglass and particulate amorphous silicon dioxide, which is cured by chemical reaction of constituents of the molding material mixture with one another, in the production of a casting mold or a core, to facilitate the breakdown and/or to increase the regeneratability of the casting mold or core.

10 Claims, No Drawings

(56) References Cited

FOREIGN PATENT DOCUMENTS

| DE | 102012113074 | 7/2014 |
|----|--------------|--------|
| DE | 102013111626 | 4/2015 |
| EP | 2308614 | 4/2011 |
| EP | 2692460 | 2/2014 |
| GB | 782205 | 9/1957 |
| WO | 2007025769 | 3/2007 |
| WO | 2014094721 | 6/2014 |

* cited by examiner

METHOD FOR PRODUCING CASTING MOLDS, CORES AND BASIC MOLD MATERIALS REGENERATED THEREFROM

CROSS-REFERENCE TO RELATED APPLICATIONS

This application is a § 371 national stage entry of International Application No. PCT/EP2018/058793, filed on Apr. 5, 2018, which claims priority to German Patent Application No. 10 2017 107 531.3, filed on Apr. 7, 2017, the entire contents of which are incorporated herein by reference.

The present invention relates to a process for producing casting molds, cores and mold base materials regenerated therefrom, to a mixture for combination with a solution or dispersion comprising waterglass for production of casting molds and/or cores, to a molding material mixture, a mold base material mixture and to a casting mold or a core. The invention further relates to the corresponding use of an amount of particulate sheet silicates having a $d_{90}$ less than 45 µm or a corresponding mixture as an additive for production of a molding material mixture comprising waterglass and particulate amorphous silicon dioxide, which is cured by chemical reaction of constituents of the molding material mixture with one another, in the production of a casting mold or a core, to facilitate the breakdown and/or to increase the regeneratability of the casting mold or the core.

Casting in a lost mold is a widespread method of producing near-net-shape components. After the casting operation, the mold is destroyed, and the casting is removed. Casting molds are negative; they contain the cavity to be cast, which results in the casting to be manufactured. The inner contours of the future casting are formed by cores. In the production of the casting mold, by means of a model of the casting to be manufactured, the cavity is shaped into the molding material. Inner contours are produced by cores that are shaped in a separate core box.

For casting molds and cores, molding materials used are predominantly refractory granular materials, for example washed classified quartz sand. The refractory mold base material is preferably in a free-flowing form, such that it can be introduced into a suitable cavity and compacted therein. The molding materials are compacted in order to increase strength. For production of the casting molds, the molding materials are bound with inorganic or organic binders. The binder produces firm cohesion between the particles of the mold base material, such that the casting mold takes on the required mechanical stability.

Casting molds and cores have to meet various demands. In the casting operation itself, they first have to have sufficient strength and thermal stability in order to be able to receive the liquid metal in the cavity formed from one or more (partial) casting molds. After commencement of the solidification operation, the mechanical stability of the casting is assured by a solidified metal layer that forms along the walls of the casting mold. The material of the casting mold is then supposed to break down under the effect of the heat released by the metal, in such a way that it loses its mechanical strength, i.e. the cohesion between individual particles of the refractory material is lost. In the ideal case, the casting molds and cores break down again to form a fine sand that can be removed from the casting without difficulty, and have correspondingly favorable breakdown properties. Nowadays, there is a particular need to reutilize the broken-down residues of utilized casting molds and cores and to use these utilized casting molds and cores to produce regenerated mold base materials. This reutilization as regenerated mold base material (regenerate) places particular demands on the breakdown properties of the casting molds and cores.

Casting molds can be produced using either organic or inorganic binders, the curing of which can be effected by cold or hot methods in each case. Cold methods refer to methods that are conducted essentially at room temperature without heating the casting mold. The curing is usually effected here by a chemical reaction which is triggered, for example, by passing a gas as catalyst through the casting mold to be cured. In hot methods, the molding material mixture, after shaping, is heated to a sufficiently high temperature, for example, to drive out the solvent present in the binder or to initiate a chemical reaction by which the binder is cured by crosslinking for example.

Irrespective of the curing mechanism, a common factor to all organic binder systems is that they break down thermally when the liquid metal is introduced into the casting mold and can release harmful substances, for example benzene, toluene, xylenes, phenol, formaldehyde and other cracking products, some of them unidentified. Although it has been possible to minimize these emissions by various measures, it is not possible to completely prevent them in the case of organic binders.

In order to minimize or to avoid the emission of breakdown products during the casting operation, it is possible to use binders that are based on inorganic materials or contain a very small proportion of organic compounds. Such binder systems have already long been known, for example from GB 782205 A, U.S. Pat. Nos. 6,972,059 B1, 5,582,232 A, 5,474,606 A and 7,022,178. The term "inorganic binder" refers hereinafter to a binder that consists to an extent of more than 95% by weight, preferably more than 99% by weight, of water and inorganic materials, such that the proportion of organic compounds in an inorganic binder is less than 5% by weight, preferably less than 1% by weight. The expression "inorganically bound" means that a casting mold or a core has been produced using an inorganic binder.

Alkali waterglass is of particular significance as a constituent of inorganic binders. Alkali waterglass, also called waterglass hereinafter, refers to vitreous, i.e. amorphous, water-soluble sodium silicates, potassium silicates and lithium silicates that have been solidified from a melt or aqueous solutions thereof. The term "waterglass" refers hereinafter to those mixtures which have a molar $SiO_2/M_2O$ modulus in the range from 1.6 to 4.0, preferably in the range from 1.8 to 2.5, where $M_2O$ denotes the total amount of lithium oxide, sodium oxide and potassium oxide. The expression "waterglass-bound" means that a casting mold or a core has been produced using a binder comprising waterglass.

Inorganically binding molding material mixtures are known in the prior art. For example, U.S. Pat. No. 7,770,629 B2 proposes a molding material mixture comprising, as well as a refractory mold base material, a waterglass-based binder and a particulate metal oxide, where particulate metal oxides used are preferably precipitated silica or fused silica.

U.S. Pat. No. 4,233,076 discloses molding material mixtures consisting of sand, an alkali metal silicate binder, at least one curing agent selected from the group of alkylene carbonate, an organic monocarboxylic or dicarboxylic acid or methyl ester thereof, carbon dioxide or blast furnace slag, and an $Al_2O_3$-containing substance, the average grain size distribution of which is between 0.2 and 5 µm.

DE 102012113073 A1 discloses a molding material mixture for production of molds and cores for metalworking, comprising at least one refractory mold base material, an inorganic binder and at least one particulate metal oxide, where the particulate metal oxide comprises or consists of at least one aluminum oxide in the alpha phase and/or at least one mixed aluminum/silicon oxide, excluding mixed aluminum/silicon oxides with a sheet silicate structure.

DE 10 2012113074 A1 discloses a molding material mixture for production of molds and cores for metalworking, comprising at least one refractory mold base material, an inorganic binder and at least one particulate mixed metal oxide, wherein the mixed particulate metal oxide is at least one particulate mixed oxide or a particulate mixture of at least two oxides, or at least one particulate mixed oxide is present alongside at least one further particulate oxide or alongside at least one further different particulate mixed oxide, and the particulate mixed metal oxide comprises at least one oxide of aluminum and at least one oxide of zirconium.

The breakdown properties of casting molds and cores (also referred to as decoring characteristics), i.e. the ability of the casting molds and cores to break down quickly after the metal casting under mechanical stress to a readily pourable form, are frequently poorer in the case of purely inorganically bound casting molds and cores, especially waterglass-bound casting molds and cores, than in the case of casting molds and cores that have been produced with an organic binder. These disadvantageous breakdown properties are typically explained in that the high temperatures in the casting operation of metal melts result in sintering of the alkali metal silicate glass-containing molding material composition or in formation of melt phases. This results in a high residual strength of the casting molds and cores. Major significance is frequently ascribed here to the alkali metal content of the molding material mixture, and high alkali metal contents are frequently regarded as being disadvantageous.

Poor breakdown properties are particularly disadvantageous when thin-wall or filigree or complex casting molds are being used, which are frequently difficult to remove in any case after the casting operation. More particularly, the poor breakdown properties are a hindrance in the aim of reutilizing inorganically bound casting molds and cores that have already been used in the casting operation, and of using such casting molds and cores to produce regenerated mold base materials (regenerates). Inadequate breakdown properties can have the result that the regenerated mold base material obtained is in lumpy form and is insufficiently free-flowing to be reused alone or in combination with "fresh" starting mold base material in the production of casting molds and cores. A process for producing a particulate refractory composition for use in the production of casting molds and cores from spent casting molds or cores that are produced from a refractory material and an alkaline binder containing alkali metal ions is disclosed in EP 2692460 B1.

A known way of solving the problem of the poor breakdown properties is to add organic breakdown promoters to the molding material mixture, which pyrolyze/react under the effect of the hot metal and hence facilitate the breakdown of the casting mold or the core after the casting operation by pore formation. Document DE 1558155 A discloses, for waterglass-bound cores, for example, the use of sugars, hard coal dust or pelletized pitch, DD 82809 B1 discloses the use of starch products, coal dust and molasses as organic breakdown promoters, and DD 141118 A1 discloses, inter alia, the use of coal dust, carbohydrates, starch, starch derivatives and sugars as breakdown promoters. However, the use of organic components in molding material mixtures during the casting operation regularly leads to the occurrence of the unwanted emissions of $CO_2$ and other pyrolysis products. It is additionally perceived as being particularly disadvantageous that organic breakdown promoters frequently lose their efficacy at high casting temperatures, since, at the high temperatures as occur in the case of steel casting, for example, there is rapid occurrence of complete burnoff of the organic breakdown promoters, whereas the melting and sintering operations still continue to take place when the organic breakdown promoters have already been consumed. In this case, the breakdown properties are frequently improved only insignificantly by organic breakdown promoters. Furthermore, the reutilizability of casting molds and cores produced from with organic breakdown promoters is frequently limited since the regenerated mold base material producible from these casting molds and cores can be contaminated with residues or breakdown products of the organic breakdown promoters that can have an adverse effect on the properties of the regenerated mold base material and therefore have to be removed in a complex manner. Furthermore, it has been found in in-house tests that the use of organic breakdown promoters can reduce the stability of the casting molds and cores produced to air humidity and/or water-based refractory coatings.

As a result of the above-detailed disadvantages of organic breakdown promoters, there is a need for alternative, preferably inorganic breakdown promoters for inorganically bound casting molds and cores, which can have a positive effect on the breakdown properties of casting molds and cores even in the case of high casting temperatures without having the disadvantages of the known organic breakdown promoters. Such inorganic breakdown promoters are described in the prior art.

Document DE 1558155 discloses that an improvement in decorability specifically of castings cast at high temperatures can be achieved when some of the inert filler is replaced by calcium carbonate, it being possible to use carbonates of other alkaline earths as well rather than calcium carbonate. However, the breakdown-promoting effect results from the breakdown of the carbonates, with release of $CO_2$. This circumstance is frequently perceived as being disadvantageous. Moreover, the disclosure of DE 1558155 relates to use in cores that are produced with the aid of waterglass which is bound by addition of a pulverulent curing agent which, as well as silicon or a silicon alloy, also contains bentonite.

DD 246488 A1 discloses a molding material having favorable breakdown properties for production of molds and cores in the process of casting production, especially for dead-mold casting products from steel casting, characterized in that one or more refractory base components and a binder consisting of a mixture of sodium silicate solution (modulus 2.2 . . . 2.6; density 1.46 . . . 1.55 g/cm$^3$) and a sodium silicate solution chemically modified with alkali metal phosphates (modulus 2.6 . . . 3.5; density 1.38 . . . 1.41 g/cm$^3$) are present, preferably in a ratio of 1:1. DD 246488 relates to those molding materials that have been cured by gassing with $CO_2$.

DE 102013111626 A1 discloses a molding material mixture for production of molds or cores, comprising at least a refractory mold base material, waterglass as binder, particulate amorphous silicon dioxide and one or more pulverulent oxidic boron compounds. The oxidic boron compounds are used here as breakdown promoters.

DE 1190610 and DE 1198495 disclose the use of bentonite for production of molds and cores that break down easily after the casting operation by the waterglass-carbonic acid method.

U.S. Pat. No. 3,203,057 discloses molding material mixtures consisting of a fine refractory material, a liquid binder consisting essentially of an alkali metal silicate solution, and a breakdown promoter consisting essentially of $Al_2O_3$. The alkali metal silicate solution here must have an alkalinity in the range of 18-30%.

DE 10 2005 041 863 A1 specifies borosilicate glass-containing molding material mixtures.

The thesis by R. Ramakrishnan (Technical University of Munich, accepted January 2016) is concerned with 3D printing with an inorganic molding material system.

DE 15 58 155 A teaches a process for producing cores.

EP 2308614 A1 describes an aerogel sand which has green strength by virtue of addition of sheet silicate and xerogel.

X. Zhang et al. report, in *Mater. Horiz.* 2014, 1, 232-236, that conventional aerogels, including organic resorcinol-formaldehyde aerogels, can be regenerated with difficulty at best and are therefore often problematic in the case of waste disposal.

It was a primary object of the present invention to specify a process for producing casting molds and cores, especially waterglass-bound casting molds and cores, wherein the casting molds and cores produced are especially to meet the following demands:
- easy producibility using commonly used apparatuses and manufacturing routines;
- high strength after production and very substantially constant strength even after a prolonged duration of storage;
- high stability to air humidity and water-containing refractory coatings, such that contact with air humidity or coating of the casting molds and cores with a water-containing refractory coating results only in small losses of strength;
- very good surface quality of the castings produced with the casting molds or cores, especially in the case of brass, iron or steel casting;
- only low, if any, emission of $CO_2$ and/or other unwanted pyrolysis products during metal casting, especially during brass, iron or steel casting;
- very good breakdown properties, i.e. low residual strength, after use in metal casting, especially in brass, iron or steel casting, such that the casting molds and cores, after use in metal casting, can be separated easily and without residue from the casting even by slight mechanical stress.

It was a further object of the present invention to configure the process such that the process can use the casting molds and cores produced, with a particularly low level of complexity, to obtain a regenerated mold base material, the properties of which are particularly similar to the starting mold base material, i.e. a mold base material of the same kind and the same origin that has not yet been used in the production of casting molds and cores.

The regenerated mold base material thus produced (first generation) is accordingly to be suitable for the production of casting molds and cores, especially for the production of casting molds and cores by the process to be specified. The regenerated mold base material produced should thus be suitable for producing casting molds and cores which meet the demands defined above and which can in turn especially, even after use in brass, iron or steel casting, show good breakdown properties and can be converted easily to a regenerated mold base material (second generation).

The object here was to configure the process such that the recyclability of the mold base material to be used in the process is particularly high, meaning that a mold base material particle considered in isolation, in the course of the process executed as a cycle, becomes part of a maximum number of casting molds or cores.

In order to be able to meet the above demands particularly efficiently, one object was to design the process to be specified such that the regenerated mold base material produced, in terms of its chemical composition, corresponds very exactly to the starting mold base material, i.e. a mold base material of the same kind and of the same origin that has not yet been used in the manufacture of casting molds and cores. This means more particularly that the content of alkali metal ions and the content of further additions, especially of any breakdown promoters present in the casting molds and cores, in the regenerated mold base material should be at a minimum in order that the concentration of these constituents is not increased in the course of the process to be specified.

Moreover, a further object was to design the process to be specified such that it can be executed particularly efficiently in practice using a mold base material cycle.

It was an additional object of the present invention to achieve implementability of steps of the process to be specified at least partly using a 3D printer or a 3D printing method.

It was a further object of the present invention to specify (i) a mixture for combination with a solution or dispersion comprising waterglass, (ii) a multicomponent binder system and (iii) a molding material mixture with which casting molds and cores that meet the demands defined above can be produced.

In addition, it was an object of the present invention to specify a mold base material mixture with which it is possible to produce casting molds and cores that meet the demands defined above, and which comprises a regenerated mold base material producible by the process to be specified (see above).

Furthermore, it was an object of the present invention to specify a casting mold or a core that meets the demands defined above.

Further (partial) objects of the present invention are apparent from the appended patent claims and the present description.

The aforementioned objects are achieved by processes, mixtures, multicomponent binder systems, molding material mixtures, mold base material mixtures, uses, casting molds and cores as defined in the appended claims. Preferred configurations of the invention are apparent from the dependent claims.

More particularly, the aforementioned objects are achieved by a process for producing casting molds, cores and mold base materials regenerated therefrom, comprising the following steps for production of a casting mold or a core:
- providing or producing a molding material mixture comprising
- a mold base material, preferably a particulate mold base material,
- a solution or dispersion comprising waterglass,
- 0.1% to 3% by weight of particulate amorphous silicon dioxide, preferably fumed particulate amorphous silicon dioxide,
- and, to facilitate the breakdown and/or to increase the regeneratability of the casting mold or the core,
- one or more particulate sheet silicates in a total amount of 0.05% to 1.5% by weight, preferably of 0.1% to 0.4% by weight, more preferably of 0.1% to 0.3% by weight, where the $d_{90}$ of the total amount of the sheet silicates is less than 45 μm, where the percentages are each based on the total mass of the molding material mixture, shaping the molding material mixture, curing the molding material mixture by chemical reaction of constituents of the molding material mixture with one another, so as to result in the casting mold or the core.

The mold base material is preferably a refractory mold base material. In the present text, "refractory", in accordance with the customary understanding of the person skilled in the art, refers to masses, materials and minerals that can at least briefly withstand the thermal stress in the casting or solidification of an iron melt, usually cast iron. Suitable mold base materials are, for example, quartz sand, zirconium sand or chromium ore sand, olivine, vermiculite, bauxite, chamotte and synthetic mold base materials.

The mold base material preferably accounts for more than 80% by weight, preferably more than 90% by weight, more preferably more than 95% by weight, of the total mass of the molding material mixture. The refractory mold base material is preferably in a free-flowing state. The mold base material for use in accordance with the invention is accordingly preferably—and as usual (see above)—in grainy or particulate form.

The average diameter of the mold base material particles is generally between 100 μm and 600 μm, preferably between 120 μm and 550 μm and more preferably between 150 μm and 500 μm. The particle size can be determined, for example, by sieving according to DIN ISO 3310. Preferably, in the context of the present invention, the particle size of the mold base material particles or the average diameter thereof is determined by sieving according to VDG-Merkblatt (i.e. datasheet from the Verein deutscher Gießereifachleute [Society of German Foundry Specialists]) P 27 of October 1999, point 4.3, which stipulates the use of testing sieves according to DIN ISO 3310.

The solution or dispersion comprising waterglass can be produced by dissolving vitreous lithium silicates, sodium silicates and potassium silicates in water. It is possible to use waterglass containing one, two or more of the alkali metal ions in question and/or containing one or additionally also one or more polyvalent cations, for example aluminum.

The solution or dispersion comprising waterglass preferably has a solids content in the range from 25% to 65% by weight, preferably from 30% to 55% by weight, more preferably from 30% to 50% by weight, based on the total mass of the solution or dispersion. In the calculation of the solids content, the entire liquid phase present in the molding material mixture, for example water or alcohol, is counted as part of the solution or dispersion.

According to the use and desired strength level of the molds and cores to be produced, the molding material mixture comprises 0.5% by weight to 5% by weight, preferably 0.75% by weight to 4% by weight, more preferably 1% by weight to 3.5% by weight, of the solution or dispersion comprising waterglass, based on the total mass of the molding material mixture.

According to the invention, the molding material mixture comprises particulate amorphous silicon dioxide ("$SiO_2$"); preferably fumed particulate amorphous silicon dioxide, in customary purity, i.e. with customary impurities and secondary constituents. The term "particulate" refers to a solid powder (including dusts) or else a granular material which is pourable and hence also sievable.

The $d_{90}$ of the particulate amorphous silicon dioxide, preferably of the fumed particulate amorphous silicon dioxide, is preferably less than 100 μm, preferably less than 45 μm, more preferably less than 25 μm. This means that 90% of the particulate amorphous silicon dioxide, preferably of the fumed particulate amorphous silicon dioxide, present in the molding material mixture is preferably smaller than 100 μm, preferably smaller than 45 μm, more preferably smaller than 25 μm. The $d_{90}$ is determined by means of scanning electron microscope images (JSM-6510 from Jeol).

Particulate amorphous silicon dioxide used may be either synthetically produced or naturally occurring types. The latter are known, for example, from DE 102007045649, but are not preferred since they frequently contain not inconsiderable crystalline components and are therefore classified as carcinogenic. Synthetically produced amorphous silicon dioxide is produced by a deliberately conducted chemical reaction. Examples of these are the flame hydrolysis of silicon tetrachloride and the reduction of quartz sand with coke, for example, in a light arc furnace in the production of silicon and ferrosilicon. The amorphous $SiO_2$ ("silicon dioxide") produced by these two methods is also referred to as fumed $SiO_2$.

Preferably, the molding material mixture comprises synthetically produced particulate amorphous $SiO_2$, more preferably fumed particulate amorphous $SiO_2$.

Fumed particulate amorphous silicon dioxide to be used with particular preference in the process of the invention (or in the molding material mixture of the process of the invention), in the context of the present invention, includes those types of particulate amorphous silicon dioxide (often also referred to as "fumed silicas") that are identified by CAS RN 69012-64-2 and CAS RN 112945-52-5. These types of fumed particulate amorphous silicon dioxide that are to be used with particular preference in the process of the invention can be produced in a manner known per se, especially by flame hydrolysis of silicon tetrachloride, by reduction of quartz sand with carbon (e.g. coke) in a light arc furnace (preferably in the production of ferrosilicon and silicon) or from $ZrSiO_4$ or in the preparation of $ZrO_2$ from $ZrSiO_4$.

Most preferably, the fumed particulate amorphous silicon dioxide to be used with preference in accordance with the invention comprises that particulate amorphous silicon dioxide which is identified by CAS RN 69012-64-2 and is preferably produced by reduction of quartz sand with carbon (e.g. coke) in a light arc furnace (in the production of ferrosilicon and silicon) or is obtained as a by-product in the production of ferrosilicon and silicon and/or which is prepared from $ZrSiO_4$ or is obtained as a by-product in the preparation of $ZrO_2$ from $ZrSiO_4$. This specific fumed particulate amorphous silicon dioxide is also referred to in the specialist field as "microsilica".

The "CAS RN" in each case represents the CAS Registry Number (CAS=Chemical Abstracts Service). This is an international designation standard for chemical substances. For every chemical substance registered in the CAS database (including biosequences, alloys, polymers) there exists a unique CAS number.

In a preferred variant of the process of the invention, the molding material mixture comprises, as particulate amorphous silicon dioxide, solely fumed particulate amorphous silicon dioxide.

Sheet silicates are silicates and, as such, salts of orthosilicic acid ($Si(OH)_4$). These salts are compounds made up of $SiO_4$ tetrahedra. Sheet silicates refer to silicates wherein the silicate anions consist of (double) layers of corner-joined SiO$_4$ tetrahedra. These layers or double layers are not joined to one another via further Si—O bonds to form frameworks. Preferred sheet silicates are kaolinite, metakaolin, montmorillonite, halloysite, hectorite, smectite, muscovite, pyrophyllite and synthetic sheet silicates, synthetic sheet silicates being those that do not occur naturally but have been artificially produced by a controlled chemical reaction.

According to the invention, the $d_{90}$ of the total amount of the sheet silicates is less than 45 μm. This means that 90% of the sheet silicate particles present in the molding material mixture are smaller than 45 μm. The $d_{90}$ is determined by means of scanning electron microscope images (JSM-6510 from Jeol).

In the process of the invention, the molding material mixture comprises one or more sheet silicates to facilitate the breakdown and/or to increase the regeneratability of the casting mold or core.

In the process of the invention, the molding material mixture preferably comprises one or more sheet silicates to facilitate the breakdown and to increase the regeneratability of the casting mold or core.

Facilitated breakdown means that the molds and cores produced from the molding material mixture, after use in metal casting, i.e. after contact with a hot metal melt, for example an iron melt, have low residual strength and can be separated from the casting rapidly and without residue even by low mechanical stress. Elevated regeneratability of the casting mold or core means that it is possible to use the mixture obtained from a casting mold used or a core by detachment from the casting to obtain a regenerate which can be reused as mold base material in a molding material mixture for production of casting molds or cores, where the chemical composition and the properties of the regenerate are particularly similar to those of the mold base material that has been used for production of the original casting mold or the original core.

The simultaneous presence of particulate amorphous silicon dioxide, preferably fumed particulate amorphous silicon dioxide, and of one or more particulate sheet silicates in the molding material mixture used for production facilitates the breakdown of casting molds or cores or increases the regeneratability thereof compared to casting molds and cores that have been produced from molding material mixtures that do not contain both particulate amorphous silicon dioxide, preferably fumed particulate amorphous silicon dioxide, and particulate sheet silicates. In the production of the molding material mixture, the procedure is, for example, that the refractory mold base material is initially charged, typically in a mixer. To this are subsequently added, while stirring, the solution or dispersion comprising waterglass, the particulate amorphous silicon dioxide, preferably the fumed particulate amorphous silicon dioxide, the particulate sheet silicates and any further constituents. The mixing time is preferably chosen such that intimate mixing of the constituents of the molding material mixture is achieved.

The shaping of the molding material mixture encompasses any deliberate and targeted shaping of the molding material mixture, i.e. any deliberate and targeted conversion of the molding material mixture to a three-dimensional shape. The molding material mixture is preferably shaped by the introduction of the molding material mixture into a (hollow) mold. Alternatively, the molding material mixture can also be shaped by other methods known to those skilled in the art. For example, the molding material mixture can be shaped within a 3D printing method by means of a 3D printer.

The curing of a molding material mixture comprises any operation by which the strength of the shaped molding material mixture is increased compared to the uncured shaped molding material mixture. The curing of a molding material mixture does not require that the curing is complete. The curing of a molding material mixture thus also includes the incomplete curing of the molding material mixture. This corresponds to the understanding of the term "curing" by the person skilled in the art, since, for reasons of reaction kinetics, it is not to be expected that all the reactive constituents in the molding material mixture produced or provided will react during the curing operation. In this respect, the person skilled in the art is aware, for example, of the phenomenon of further curing of the molding material mixture.

According to the invention, the molding material mixture is cured by chemical reaction of constituents of the molding material mixture with one another, so as to result in the casting mold or the core. The cause of the curing of a molding material mixture comprising a solution or dispersion comprising waterglass is essentially the condensation of the waterglass, i.e. the joining of the silicate units of the waterglass to one another.

In the context of the present invention, the molding material mixture is cured by chemical reaction of constituents of the molding material mixture with one another when no further substances that take part in the curing reaction or initiate it in the first place have to be supplied from the outside or are even supplied by means of suitable apparatuses to the shaped molding material mixture to assist or bring about the curing.

Examples of curing of the molding material mixture by chemical reaction of constituents of the molding material mixture with one another are processes that are known per se to the person skilled in the art in which the curing is assisted or brought about by heating of the shaped molding material mixture, and processes in which the curing of the molding material mixture is assisted or brought about by the hydrolysis of an ester that is part of the mold base material mixture.

An example of noninventive curing of the molding material mixture is a process in which the curing of the molding material mixture is assisted or brought about in suitable systems and/or using suitable apparatuses (such as conduits, pumps etc.) by controlled gassing of the shaped molding material mixture with a gas or gas mixture containing more than 1 mol % of $CO_2$. In such processes, known as $CO_2$ processes, for curing of a molding material mixture, the molding material mixture is cured not merely by chemical reaction of constituents of the molding material mixture with one another, but especially also by the reaction of constituents of the molding material mixture with a reactant supplied from the outside, namely $CO_2$. By contrast with the casting molds and cores produced by the process of the invention, casting molds and cores that have been produced by curing by the $CO_2$ process with otherwise the same process configuration do not have the surprising advantages observed. More particularly, corresponding casting molds and cores have poor breakdown properties and distinctly lower regeneratability compared to casting molds and cores of the invention.

It will be apparent that the process of the invention is preferably conducted under ambient conditions, i.e. in the presence of ambient air. Although this ambient air contains carbon dioxide, this does not correspond to curing by the $CO_2$ process within the scope of the present invention, which requires the targeted gassing of the molding material mixture with a CO$_2$-rich gas, especially in suitable systems and/or using suitable apparatuses (such as conduits, pumps etc.). Conversely, when the CO$_2$ process is employed, there may also be a small degree of chemical linkage of the waterglass constituents not involving any of the CO$_2$ molecules supplied. However, this is not regarded as curing of the molding material mixture by chemical reaction of constituents of the molding material mixture with one another.

Preference is correspondingly given to processes of the invention (preferably as defined above as preferred), wherein the curing of the molding material mixture is effected to an extent of more than 95%, preferably more than 99%, by chemical reaction of constituents of the molding material mixture with one another, based on the number of condensation reactions, and/or wherein the curing of the molding material mixture is not effected by the CO$_2$ process.

Preference is given to an above-specified process of the invention (preferably as defined above as preferred), comprising the following steps for production of a casting mold or core:

providing or producing a molding material mixture comprising
    a mold base material, preferably a particulate mold base material,
    where the average diameter of the mold base material particles is preferably in the range from 100 μm to 600 μm, more preferably in the range from 120 μm to 550 μm and especially preferably in the range from 150 μm to 500 μm, with a particle size and the average diameter of the mold base material particles being determined by sieving according to VDG-Merkblatt P 27 of October 1999, point 4.3,
    a solution or dispersion comprising waterglass, where the waterglass in the molding material mixture preferably has a molar SiO$_2$/M$_2$O modulus in the range from 1.6 to 4.0, more preferably in the range from 1.8 to 2.5, where M$_2$O denotes the total amount of lithium oxide, sodium oxide and potassium oxide,
    0.1% to 3% by weight of particulate amorphous silicon dioxide, preferably fumed particulate amorphous silicon dioxide,
    and, to facilitate the breakdown and/or to increase the regeneratability of the casting mold or the core,
    one or more particulate sheet silicates in a total amount of 0.05% to 1.5% by weight, preferably of 0.1% to 0.4% by weight, more preferably of 0.1% to 0.3% by weight, where the do of the total amount of the sheet silicates is less than 45 μm,
  where the percentages are each based on the total mass of the molding material mixture,
  shaping the molding material mixture,
  curing the molding material mixture by chemical reaction of constituents of the molding material mixture with one another, so as to result in the casting mold or the core.

Preference is given to a process of the invention (preferably as defined above as preferred), wherein the molding material mixture comprises one or more of the following constituents:

0.3% to 3% by weight, preferably 0.57% to 0.77% by weight, of particulate amorphous silicon dioxide, preferably fumed particulate amorphous silicon dioxide,
  one or more particulate sheet silicates in a total amount of 0.1% to 0.4% by weight, preferably 0.1% to 0.3% by weight, where the do of the total amount of the sheet silicates is less than 45 μm,
  graphite and/or molybdenum(IV) sulfide in a total amount of up to 1% by weight, preferably of up to 0.2% by weight, preferably in a total amount in the range from 0.01% to 0.2% by weight, preferably in the range from 0.03% to 0.08% by weight, where preferably only graphite is used,
  esters in a total amount up to 0.4% by weight, preferably in a total amount in the range from 0.01% by weight to 0.4% by weight, where preferably at least one of the esters is selected from the group consisting of the intramolecular or intermolecular reaction products of an alcohol and acid, where
    the alcohol is selected from the group consisting of C1-C8 monoalcohols, C1-C8 dialcohols, preferably C2-C8 dialcohols, and C1-C8 trialcohols, preferably C3-C8 trialcohols, preferably selected from the group consisting of ethylene glycol, propane-1,2-diol and glycerol,
    and
    the acid is selected from the group consisting of organic C2-C8 monocarboxylic acids, organic C2-C8 dicarboxylic acids, organic C2-C8 tricarboxylic acids, preferably organic C4-C8 tricarboxylic acids, and inorganic acids, preferably selected from the group consisting of formic acid, acetic acid, propionic acid, lactic acid, oxalic acid, succinic acid, malonic acid, phosphoric acid, sulfuric acid, boric acid and carbonic acid,
  where preferably at least one of the esters is propylene carbonate or γ-butyrolactone,
  up to 4% by weight of particulate mixed metal oxides, preferably comprising at least one oxide of aluminum and at least one oxide of zirconium,
  one or more surface-active substances selected from the group consisting of anionic surfactants, nonionic surfactants, cationic surfactants and amphoteric surfactants in a total amount of 0.001 to 1% by weight,
  one or more oxidic boron compounds in a total amount of 0.002% to 1% by weight,
    where the one or at least one of the oxidic boron compounds is preferably selected from the group consisting of borates, boric acids, boric anhydrides, borosilicates, borophosphates, and borophosphosilicates, more preferably selected from the group consisting of alkali metal and alkaline earth metal borate, where the oxidic boron compound preferably does not contain any organic groups,
  one or more phosphorus compounds in a total amount of 0.05% to 1% by weight,
    where the one or at least one of the phosphorus compounds is preferably selected from the group consisting of organic phosphates and inorganic phosphates, preferably selected from the group consisting of inorganic alkali metal phosphates,
  one or more carbohydrates in a total amount of 0.01% to 10% by weight,
    where the one or at least one of the carbohydrates is preferably selected from the group consisting of oligosaccharides and polysaccharides, preferably selected from the group consisting of cellulose, starch and dextrin,
  0.02 to 5% by weight of barium sulfate,
  one or more silanes in a total amount of 0.1% to 2% by weight, where the one or at least one of the silanes is preferably selected from the group consisting of aminosilanes, epoxysilanes, mercaptosilanes, hydroxysilanes and ureidosilanes,
one or more lithium compounds in a total amount of 0.01% to 0.2% by weight,
where the one or at least one of the lithium compounds is preferably selected from the group consisting of amorphous lithium silicates, lithium oxides and lithium hydroxide,
particulate alumina, preferably in the alpha phase, and/or particulate mixed aluminum/silicon oxide without sheet silicate structure in a total amount of 0.05% to 4% by weight,
where the percentages are each based on the total mass of the molding material mixture.

Correspondingly preferred processes of the invention have been found to be particularly advantageous in in-house experiments because they have been used to produce casting molds and cores that have particularly good breakdown properties and which can be regenerated particularly easily in such a way that the regenerated mold base material recovered can be used again particularly easily as mold base material, especially again in a process of the invention.

Graphite and/or molybdenum(IV) sulfide act as lubricants and hence improve the processibility of the molding material mixture; more particularly, in processes of the invention, they facilitate the step of shaping the molding material mixture. Surprisingly, the presence of these substances in the molding material mixture does not have an adverse effect on the breakdown properties of the molds and cores produced. It has been found that graphite is preferable over molybdenum(IV) sulfide because the regeneratability of the casting molds and cores produced is higher in this case.

A further constituent present with preference in the molding material mixture is esters. Esters are the reaction products of an alcohol and acid in an esterification reaction, wherein the esterification reaction can be effected not only intermolecularly but also intramolecularly, i.e. causes a ring closure within a single molecule that has both an acid function and an OH group. One example of an ester which is an intramolecular reaction product of an alcohol and acid is γ-butyrolactone. Esters are preferred as a constituent of the molding material mixture because they can bring about or assist the curing of the molding material mixture; corresponding curing processes are also known to the person skilled in the art as "ester processes".

Advantageously, it has been found in in-house experiments that the molding material mixture to be provided or produced in the process of the invention may also contain one or more constituents selected from the group consisting of particulate mixed metal oxides, surface-active substances, oxidic boron compounds, phosphorus compounds, carbohydrates, barium sulfate, silanes, lithium compounds and particulate alumina (preferably as specified above as preferred) in the amounts specified without impairing the advantages of the process of the invention, especially the improved breakdown properties and the elevated regeneratability of the casting molds and cores producible by the process of the invention. This is advantageous especially because it is possible to use the above-detailed constituents to adjust the processing properties of the molding material mixture and/or the properties of the casting molds and cores produced (for example strength of the casting molds and cores or the surface quality of the castings producible) to the respective requirements without losing the advantages of the process of the invention.

Barium sulfate can be added to the molding material mixture in order to further improve the surface quality of the casting, especially in aluminum casting. The barium sulfate is preferably added in an amount of 0.05% to 3.0% by weight, more preferably 0.1% to 2.0% by weight, based on the total mass of the molding material mixture.

Silanes are preferably added to the molding material mixtures in order to improve the wettability of the mold base material or the flowability of the molding material mixture.

Particulate alumina, preferably in the alpha phase, and/or particulate mixed aluminum/silicon oxide without sheet silicate structure and/or particulate mixed metal oxides can be added to the molding material mixture in order to further improve the surface quality of the casting, especially in steel and iron casting, such that, after the removal of the casting mold from the casting, only minor reprocessing, if any at all, of the surface of the casting is required. Preference is given to concentrations between 0.1% by weight and 2.0% by weight, more preferably between 0.1% by weight and 1.5% by weight, especially preferably between 0.2% by weight and 1.2% by weight, based on the total mass of the molding material mixture.

Phosphorus compounds can be added to the molding material mixture in order to enable the production of particularly thin-wall casting molds and cores which nevertheless have high strength and have high stability when used in metal casting. Aluminum phosphates can additionally also be used as hardener for the waterglass binder.

Surface-active substances, especially surfactants, can be added to the molding material mixture in order to improve the flowability of the molding material mixture. Suitable representatives of these compounds are described, for example, in WO 2009/056320 (=US 2010/0326620 A1).

Oxidic boron compounds can be added to the molding material mixture in order to enable the production of particularly moisture-resistant casting molds and cores.

Carbohydrates can be added to the molding material mixture in order to enable the production of particularly firm casting molds and cores having high storage stability.

Lithium compounds can be added to the molding material mixture in order to enable the production of particularly storage-stable casting molds and cores having high stability to moisture.

The above-defined preferred contents of particulate amorphous silicon dioxide, preferably of fumed particulate amorphous silicon dioxide, and the total amount of particulate sheet silicate have been found in in-house experiments to be the regions in which the surprising effects of the improved breakdown properties and the elevated regeneratability of the casting molds and cores produced by the process of the invention are manifested particularly clearly. These effects are particularly marked when the molding material mixture comprises both constituents in the amounts specified as preferred, preferably in the amounts specified as particularly preferred.

This means that a very preferred process of the invention (preferably as defined above as preferred) is one wherein the molding material mixture comprises
0.3% to 3% by weight, preferably 0.57% to 0.77% by weight, of particulate amorphous silicon dioxide, preferably fumed particulate amorphous silicon dioxide, and
one or more particulate sheet silicates in a total amount of 0.1% to 0.4% by weight, preferably 0.1% to 0.3% by weight, where the do of the total amount of the sheet silicates is less than 45 μm.

Taking account of the aforementioned advantages, particular preference is given to a process of the invention (preferably as defined above as preferred) comprising the providing or producing of a molding material mixture comprising
- a mold base material,
- a solution or dispersion comprising waterglass,
- one or more particulate sheet silicates in a total amount of 0.1% to 0.4% by weight, preferably 0.1% to 0.3% by weight, where the do of the total amount of the sheet silicates is less than 45 μm,
- 0.3% to 3% by weight, preferably 0.57% to 0.77% by weight, of particulate amorphous silicon dioxide, preferably fumed particulate amorphous silicon dioxide, and
- 0.01 to 1% by weight of graphite, where the percentages are each based on the total mass of the molding material mixture.

Particular preference is also given to a process of the invention (preferably as defined above as preferred) comprising the providing or producing of a molding material mixture comprising
- a mold base material,
- a solution or dispersion comprising waterglass,
- one or more particulate sheet silicates in a total amount of 0.1% to 0.4% by weight, preferably 0.1% to 0.3% by weight, where the do of the total amount of the sheet silicates is less than 45 μm,
- 0.3% to 3% by weight, preferably 0.57% to 0.77% by weight, of particulate amorphous silicon dioxide, preferably fumed particulate amorphous silicon dioxide,
- 0.01 to 1% by weight of graphite, and
- one or more constituents selected from the group consisting of particulate mixed metal oxides, surface-active substances, oxidic boron compounds, phosphorus compounds, carbohydrates, barium sulfate, silanes, lithium compounds and particulate alumina (preferably as defined above as preferred), where the percentages are each based on the total mass of the molding material mixture.

Preference is additionally given to a process of the invention (preferably as defined above as preferred) wherein the waterglass in the molding material mixture has a molar $SiO_2/M_2O$ modulus in the range from 1.6 to 4.0, preferably in the range from 1.8 to 2.5, where $M_2O$ denotes the total amount of lithium oxide, sodium oxide and potassium oxide.

A correspondingly preferred process of the invention is advantageous because this process can be used to produce particularly firm casting molds and cores having excellent breakdown properties that can easily be regenerated.

In the case of a higher molar modulus of the waterglass than specified above, the starting strength of the casting molds or cores produced from the molding material mixture is insufficient in some cases to use them in metal casting, especially in steel, iron or brass casting.

In the case of a lower molar modulus, the heating of the casting mold or core produced from the molding material mixture in the casting operation in some cases leads merely to a still comparatively high residual strength, such that the breakdown properties are somewhat less advantageous than in the case of casting molds and cores that are produced by a preferred process of the invention. In the case of a higher concentration of $M_2O$, i.e. in the case of a lower molar modulus, in addition, somewhat less advantageous regeneratability of the casting molds and cores produced from the molding material mixture is found, especially a less advantageous repeat regeneratability. The latter means that the regeneratability of a casting mold or core that has been produced from a molding material mixture comprising already regenerated mold base material is reduced in this case. This less favorable property compared to the preferred process of the invention is probably connected to the enrichment of alkali metal oxides in the regenerated mold base material.

Preference is given to a process of the invention (preferably as defined above as preferred) wherein the mold base material comprises quartz sand, preferably at least 50% by weight, more preferably at least 80% by weight, of quartz sand, based on the total mass of the mold base material.

Correspondingly preferred processes of the invention have been found to be particularly advantageous in practice because, when quartz sand is used as mold base material, particularly good decomposition and hence good regeneratability of the casting molds and cores producible from the molding material mixture is found, and so this mold base material is technically preferred. The reason for this could be that the quartz sand, consisting of silicon dioxide, exhibits particularly high chemical compatibility with the likewise silicon-based waterglass used as binder and the particulate amorphous silicon dioxide, preferably the fumed particulate amorphous silicon dioxide. By virtue of the combination of these constituents comprising primarily silicon and oxygen, barely any extraneous constituent accumulates in the regenerated mold base material, i.e., for example, no oxides of other elements.

A regenerated mold base material which, as well as the quartz sand used, also comprises small amounts of cured waterglass and residues of the particulate amorphous silicon dioxide, preferably the fumed particulate amorphous silicon dioxide, is chemically only insignificantly contaminated, if at all, by these constituents since the constituents have the same or at least a very similar chemical composition. By contrast, a mold base material other than quartz sand is contaminated especially with small amounts of silicon dioxide with each regeneration operation, such that there is a change in the properties and the chemical composition of the mold base material compared to an unregenerated mold base material.

Preference is given to a process of the invention (preferably as defined above as preferred) wherein the curing of the molding material mixture
- is assisted or brought about by heating the shaped molding material mixture, preferably by heating in a heated shaping mold, preferably in a heated shaping mold with a temperature in the range from 100 to 300° C., and/or by gassing with hot air, where the heating and/or the gassing preferably establishes a temperature in the range from 120 to 180° C. at least in regions of the shaped molding material mixture,
- is assisted or brought about by the hydrolysis of an ester, where at least one of the esters is preferably selected from the group consisting of the intramolecular or intermolecular reaction products of an alcohol and an acid, where
  - the alcohol is selected from the group consisting of C1-C8 monoalcohols, C1-C8 dialcohols, preferably C2-C8 dialcohols, and C1-C8 trialcohols, preferably C3-C8 trialcohols, preferably selected from the group consisting of ethylene glycol, propane-1,2-diol and glycerol,
  - and
  - the acid is selected from the group consisting of organic C2-C8 monocarboxylic acids, organic C2-C8 dicarboxylic acids, organic C2-C8 tricarboxylic acids, preferably organic C4-C8 tricarboxylic acids, and inorganic acids, preferably selected from the group consisting of formic acid, acetic acid, propionic acid, lactic acid, oxalic acid, succinic acid, malonic acid, phosphoric acid, sulfuric acid, boric acid and carbonic acid, where at least one of the esters is preferably propylene carbonate or y-butyrolactone, or is assisted or brought about by gassing of the shaped molding material mixture with a gas or gas mixture containing less than 1 mol % of $CO_2$.

Correspondingly preferred processes of the invention are performable particularly easily, reliably and using established methods, and additionally enable the production of casting molds and cores with very particularly favorable breakdown properties and very particularly advantageous regeneratability.

The curing of the molding material mixture can be assisted or brought about by heating the shaped molding material mixture since the elevated temperature and optionally a hot air stream remove water from the molding material mixture. Since water is one of the products of the linkage reaction of waterglass, the chemical equilibrium of the linkage reaction, by Le Chatelier's principle, is shifted to the side of the condensed waterglass, i.e. the cured waterglass, such that the curing of the molding material mixture is assisted or brought about.

The curing of the molding material mixture can also be assisted or brought about by the hydrolysis of an ester. The hydrolysis reaction likewise removes by-products of the condensation reaction of waterglass from the chemical equilibrium, which is therefore shifted, by Le Chatelier's principle, in the direction of the condensed waterglass, i.e. the cured waterglass.

In addition, the water present in the molding material mixture or the water formed in the condensation of the waterglass can also be driven out by the gassing of the shaped molding material mixture with a gas or gas mixture, which assists or brings about the curing as described above. However, it should be ensured in this case that the gas or gas mixture used contains less than 1 mol % of $CO_2$, meaning that the curing is not effected by the $CO_2$ process but in the inventive manner.

What is advantageous about the preferred processes of the invention is that they can assist or bring about the curing of the molding material mixture in a particularly effective manner without reducing the breakdown properties and especially the regeneratability of the casting molds and cores produced by the process. The advantages of the process of the invention are manifested particularly clearly compared to processes in which the $CO_2$ process is used to cure the molding material mixture. Those casting molds and cores that have been produced by curing a molding material mixture by the $CO_2$ process show considerably poorer regeneratability, which is probably caused by the formation of alkali metal carbonates in the course of curing, which subsequently make it impossible or considerably more difficult to obtain an advantageous regenerated mold base material, i.e. a regenerated mold base material that can be used again in the production of casting molds and cores.

In other words, preference is also given to a process of the invention (preferably as defined above as preferred), wherein the curing of the molding material mixture is not assisted or brought about by gassing the shaped molding material mixture using gassing apparatuses with a gas or gas mixture containing more than 1 mol % $CO_2$ and/or is not assisted or brought about by the $CO_2$ process.

Preference is given to a process of the invention (preferably as defined above as preferred), wherein the casting mold produced or the core produced is heated temporarily at least in regions to a temperature of >900° C. such that the breakdown is subsequently facilitated, preferably with heating to a temperature of <1600° C., more preferably to a temperature in the range between 900° C. and 1600° C.

Preference is given to corresponding processes of the invention because the improved breakdown properties of the molds and cores producible by the process of the invention are manifested particularly clearly when these are heated temporarily at least in regions in the casting operation to a temperature of >900° C., the temperature preferably being less than 1600° C. This means that the casting mold produced or the core is preferably heated temporarily at least in regions to a temperature in the range between 900° C. and 1600° C.

Even though the technical effects of the present invention are also manifested outside the temperature ranges specified, the temperature range specified is preferred since the breakdown properties of casting molds and cores, when they have not been heated temporarily at least in regions to a temperature of >900° C. in the course of the casting operation, are in practice sometimes regarded as less problematic in any case since there is a smaller degree of sintering and formation of melt phases in the casting molds or cores at lower temperatures that are typically regarded as one cause of adverse breakdown properties. At temperatures above 1600° C., which are only of minor significance in foundry practice, it is sometimes likewise observed that the breakdown of the casting molds and cores is less problematic, and so the absolute improvement in the breakdown properties is smaller. Accordingly, the advantages of the process of the invention are particularly noticeable within the temperature range specified.

The reason why the advantages of the process of the invention are particularly marked with regard to the improvement in breakdown at temperatures >900° C. is probably explicable by the thermally induced processes in the molding material mixture that proceed at corresponding temperatures.

The casting molds or cores produced by the process of the invention are generally heated temporarily to the above-specified temperatures (>900° C.; <1600° C.) by the contacting with a metal melt in the casting operation. Preference is accordingly given to a process of the invention (preferably as defined above as preferred) wherein the casting mold produced or the core produced is heated temporarily at least in regions to a temperature of >900° C. by contacting with a metal melt in the casting operation such that the breakdown is subsequently facilitated, preferably with heating to a temperature <1600° C., more preferably to a temperature in the range between 900° C. and 1600° C.

The heating of the casting mold or of the core with a metal melt requires that the temperature of the metal melt is sufficiently high. Typical metal melts that are processed at correspondingly high temperatures are metal melts consisting of iron, iron alloys, steel, steel alloys, brass or brass alloys.

Preference is correspondingly given to a process of the invention (preferably as defined above as preferred) wherein a metal melt consisting of iron, iron alloys, steel, steel alloys, brass or brass alloys is used.

Correspondingly preferred processes of the invention are advantageous especially because the use of the metal melts specified in practice has frequently to date led to particularly poor breakdown properties of the casting molds or cores used, especially in the case of use of molding material mixtures comprising waterglass, such that the process of the invention in these cases leads to particularly great absolute improvements in the breakdown properties and in some cases makes it viable in the first place to use waterglass-bound casting molds and cores in these casting operations.

Preference is given to a process of the invention (preferably as defined above as preferred) wherein the cured, shaped molding material mixture is provided wholly or partly with a coating of a refractory coating composition, where the d0 of the total amount of the solid particles present in the refractory coating composition is preferably less than 200 µm, where the refractory coating composition is preferably a water-based refractory coating or an alcohol-based refractory coating, more preferably a water-based refractory coating.

Preference is given to corresponding processes of the invention because the use of casting molds and cores when casting iron typically requires that the casting molds or cores are provided wholly or at least partly with a coating of a refractory coating composition. Advantageously, corresponding coated casting molds and cores can be produced by the process of the invention without any significant adverse effect on the effects and advantages associated with the invention thereby.

Refractory coatings are suspensions of fine-particulate refractory to highly refractory inorganic materials in a carrier liquid, for example water or alcohol. The first case is referred to by the person skilled in the art as a water-based refractory coating, while the second case is referred to as an alcohol-based refractory coating. The refractory coating is applied to the casting mold or the core by a suitable application method, for example spraying, dipping, flow coating or painting, and dried thereon, so as to form a coating with the refractory coating composition.

It is advantageous that the still uncoated casting molds and cores produced by the process of the invention are particularly resistant to water and air humidity, such that coating of these casting molds and cores can also be accomplished using water-based refractory coatings without loss of the advantageous basic strength and the good breakdown properties of the casting molds and cores. The use of water-based refractory coatings is particularly advantageous because these are more environmentally compatible than alcohol-based refractory coatings and lead to lower workplace pollution with emissions.

The need to coat casting molds and cores for particular end uses is frequently perceived as being disadvantageous with regard to the regeneratability of the molds and cores because the refractory coating differs in its physical composition from the cured molding material mixture, but it can be separated therefrom again only with difficulty after the breakdown of the casting mold or core, and so the regenerated mold base material can be contaminated by constituents of the refractory coating composition. The more often the mold base material is regenerated, the more pronounced this effect.

It has been found that the regeneratability of coated casting molds and cores produced in a process of the invention is improved when the d0 of the total amount of the solid particles present in the refractory coating composition is less than 200 µm. It has been found that especially mold base material having a particle size >200 µm as regularly present in "coated" casting molds and cores produced by the process of the invention can be separated particularly easily from the constituents of the refractory coating composition during the regeneration, and it is advantageously possible to use the same removal process that is also employed for removal of the further constituents of the molding material mixture used for production, especially the particulate sheet silicate used, from the mold base material to be regenerated. The constituents of the refractory coating composition are preferably removed by a physical removal, more preferably by physical dust removal.

Preference is given to a process of the invention (preferably as defined above as preferred) for producing a regenerated mold base material from the casting mold produced or core produced after heating, comprising the following additional steps:

acting mechanically on the casting mold produced or the core produced, such that the casting mold or core breaks down, producing the regenerated mold base material from the broken-down casting mold or the broken-down core, preferably comprising the separating-off and removing of dust, wherein the separating-off preferably comprises a physical separation.

A corresponding preferred process of the invention is advantageous because this process uses a casting mold produced or a core produced, in a particularly simple manner and in a readily automatable process, to produce a regenerated mold base material.

A regenerated mold base material with a particularly advantageous quality, i.e. with particularly good suitability for reuse in a process for producing casting molds and cores, is obtained when the producing of the regenerated mold base material comprises the separating-off and removing of dust. The term "dust" refers to all particles having a diameter of <200 µm. This means that, more particularly, the fractions of the particulate sheet silicate used in accordance with the invention in the molding material mixture are removed, but also any other constituents present in the dust having a particle diameter of <200 µm, for example the solid particles of a refractory coating composition.

The separating-off and removing of the dust preferably comprises a physical separation of the dust. This can be effected, for example, by washing out the dust. However, particular preference is given to physical separation by windsifting, meaning that the dust is separated from the other constituents in a gas stream. A corresponding process is preferred because windsifting can be integrated particularly easily into a mold base material recycling system and leads to particularly thorough separation of the dust. It is also advantageous that the regenerated mold base material obtained is not contaminated by this process and, for example, no drying steps are necessary.

Preference is given to a process of the invention (preferably as defined above as preferred), wherein the molding material mixture produced or provided contains a proportion of regenerated mold base material that has been produced by the process specified above as preferred.

A correspondingly preferred process of the invention is particularly advantageous because the good strengths and the excellent breakdown properties are surprisingly also manifested for those casting molds and cores produced in which the molding material mixture provided or produced by the process of the invention already contains a proportion of mold base material regenerated in the inventive manner. In other processes known from the prior art, the use of regenerated mold base material is perceived to be disadvantageous in some cases, and losses have to be accepted in the strength and the breakdown properties of the casting molds and cores if the environmental and economic advantages of the use of regenerated mold base material are to be utilized.

More particularly, the preferred process of the invention has the advantage that the regeneratability of the casting molds and cores produced is also only slightly impaired, if at all, by the use of a regenerated mold base material compared to processes known from the prior art, such that the process of the invention can be configured particularly easily in such a way that it comprises a mold base material cycle, i.e. a mold base material recycling system. This means that the qualitative deterioration in the mold base material that progresses with every reutilization is advantageously particularly small. More particularly, it is advantageously possible by the process of the invention to obtain a regenerated mold base material, the chemical composition of which is particularly similar to that of the corresponding unconsumed mold base material.

Preference is given to a process of the invention (preferably as defined above as preferred),
  wherein the shaping of the molding material mixture and/or the curing of the molding material mixture is effected by means of a 3D printer
  and/or
  wherein the shaping of the molding material mixture is effected in a 3D printing method and the curing of the molding material mixture is effected during the 3D printing operation and/or after the 3D printing operation.

Corresponding preferred processes of the invention are advantageous because the production of casting molds and cores by means of a 3D printer and/or in a 3D printing method enables the production of casting molds and cores that have a complex geometry and at the same time have a particularly uniform structural construction and a particularly homogeneous distribution of the constituents in the shaped molding material mixture.

Casting molds and cores produced by a corresponding preferred process of the invention advantageously show only slight inhomogeneities or concentration gradients, if any, in the shaped and/or cured molding material mixture that could lead to unwanted clumping or to locally reduced breakdown properties.

The breakdown properties of corresponding casting molds and cores are thus, irrespective of the complexity of their geometry, particularly uniform, constant and reproducible, which means that high process reliability is advantageously achieved in the production of casting molds and cores.

In addition, the regeneratability of corresponding casting molds and cores is particularly high since these, as a result of their homogeneous composition, even under slight mechanical stress, result in a particularly fine-particulate breakdown product that has a very small proportion of agglomerated mold base material particles that can otherwise form, for example, as a result of a locally particularly high concentration of binder or a locally particularly low molar modulus of the waterglass.

The invention additionally relates to a mixture for combination with a solution or dispersion comprising waterglass for production of casting molds and/or cores, comprising
  10% to 98% by weight of particulate amorphous silicon dioxide, preferably fumed particulate amorphous silicon dioxide,
  0% to 15% by weight of graphite,
  one or more particulate mixed metal oxides each comprising at least one oxide of aluminum and/or at least one oxide of zirconium in a total amount of 0% to 80% by weight,
  and, to facilitate the breakdown and/or to increase the regeneratability of the casting mold or the core,
  one or more particulate sheet silicates in a total amount of 2% to 80% by weight, where the $d_{90}$ of the total amount of the sheet silicates is less than 45 µm,
  where the percentages are based on the total mass of the mixture.

A corresponding mixture is advantageous because the molding material mixture to be produced or provided by the process of the invention can be produced in a particularly simple manner by virtue of the combination of the mixture of the invention with a solution or dispersion comprising waterglass and a mold base material. Surprisingly, corresponding mixtures of the invention are also particularly storage-stable.

Preference is given to a mixture of the invention comprising
  25% to 95% by weight, preferably 40% to 95% by weight, of particulate amorphous silicon dioxide, preferably fumed particulate amorphous silicon dioxide,
  1.5% to 12.5% by weight, preferably 1.5% to 6% by weight, of graphite,
  one or more particulate mixed metal oxides each comprising at least one oxide of aluminum and/or at least one oxide of zirconium, in a total amount of 0% to 65.5% by weight, preferably 0% to 45% by weight,
  one or more particulate sheet silicates in a total amount of 5% to 50% by weight, preferably 15% to 50% by weight, where the $d_{90}$ of the total amount of the sheet silicates is less than 45 µm,
  where the percentages are based on the total mass of the mixture.

Such preferred mixtures of the invention are advantageous because the flowability of the mixture and processibility thereof are particularly high. Corresponding mixtures of the invention can be transported particularly easily through pipelines, especially in continuously operated plants.

Preference is given to a mixture of the invention (preferably as defined above as preferred) additionally comprising one or more compounds selected from the group consisting of surface-active substances, oxidic boron compounds, phosphorus compounds, carbohydrates, silanes, lithium compounds, particulate alumina, particulate mixed aluminum/silicon oxides without sheet silicate structure and barium sulfate,
  where the surface-active substances are preferably selected from the group consisting of anionic surfactants, nonionic surfactants, cationic surfactants, amphoteric surfactants and mixtures thereof,
  where the oxidic boron compounds are preferably selected from the group consisting of borates, boric acids, boric anhydrides, borosilicates, borophosphates, borophosphosilicates and mixtures thereof,
  where the phosphorus compounds are preferably selected from the group consisting of organic phosphates, inorganic phosphates and mixtures thereof,
  where the carbohydrates are preferably selected from the group consisting of oligosaccharides, polysaccharides and mixtures thereof, preferably selected from the group consisting of cellulose, starch, dextrin and mixtures thereof, where the silanes are preferably selected from the group consisting of aminosilanes, epoxysilanes, mercaptosilanes, hydroxysilanes, ureidosilanes and mixtures thereof, where the lithium compounds are preferably selected from the group consisting of amorphous lithium silicates, lithium oxides, lithium hydroxide and mixtures thereof.

Corresponding preferred mixtures of the invention are advantageous because these can be used particularly easily to produce preferred molding material mixtures of the invention for the process of the invention, and the presence of the compounds cited does not have any adverse effect on the shelf life and processibility of the mixture. In this respect, the above remarks relating to preferred constituents of the molding material mixture for use in accordance with the invention and relating to the respective advantages thereof are correspondingly applicable, mutatis mutandis.

It is especially advantageous in this respect that, when corresponding mixtures are used, it is unnecessary to individually store and process the individual constituents; instead, these can be added to the molding material mixture to be produced in accordance with the invention in the form of a single component, namely as the preferred mixture of the invention.

Preference is given to a mixture of the invention (preferably as defined above as preferred) wherein the mixture is a solid-state mixture or a dispersion composed of two or more phases.

Particular preference is given here to a mixture of the invention (preferably as defined above as preferred), wherein the mixture is a dispersion composed of two or more phases.

In corresponding mixtures of the invention, at least one phase is a liquid phase. In this way, it is possible to advantageously influence the processing properties of correspondingly preferred mixtures of the invention since this mixture can be guided particularly easily through pipelines with the aid of pump systems and hence are advantageous particularly for large and possibly continuously operating plants. Moreover, corresponding mixtures are particularly advantageous with regard to occupational safety and occupational health, since corresponding mixtures do not dust and hence do not lead to a fine and ultrafine dust nuisance in the workplace on processing, and so the risk of respiratory pathway disorders can advantageously be minimized.

Moreover, corresponding preferred mixtures of the invention can be mixed particularly easily, rapidly and completely with the further constituents of a molding material mixture for use in the process of the invention, such that a particularly homogeneous molding material mixture free of concentration gradients is obtained. It is particularly advantageous that water-soluble constituents of the molding material mixture can already be added in dissolved form when corresponding mixtures are used, which avoids local concentration gradients in the molding material mixture that can be caused by slow and/or incomplete dissolution.

The invention further relates to a multicomponent binder system comprising, as spatially separate or mutually mixed components, (A) a mixture of the invention as defined above, preferably as defined above as preferred, (B) a solution or dispersion comprising
waterglass, preferably a waterglass having a modular $SiO_2/M_2O$ modulus in the range from 1.6 to 4.0, preferably 1.8 to 2.5, where $M_2O$ refers to the total amount of lithium oxide, sodium oxide and potassium oxide.

Corresponding multicomponent binder systems of the invention are advantageous because these can be used particularly easily to produce the molding material mixtures to be produced in a process of the invention, especially also preferred molding material mixtures. In this respect, the above remarks relating to preferred constituents of the molding material mixture for use in accordance with the invention and to the respective advantages thereof are correspondingly applicable, mutatis mutandis. Corresponding multicomponent binder systems are particularly advantageous when used by the end user, i.e. at foundry operations that employ the process of the invention, since the handling and processing to give a molding material mixture for use in the process of the invention can be effected particularly easily and safely, and at the same time are particularly insusceptible to errors, for example in dosage. Preferably, the multicomponent binder system of the invention, for this reason, comprises the components as mutually mixed components, which further minimizes susceptibility to user error with the end user.

Preference is given to a multicomponent binder system of the invention (preferably as defined above as preferred), comprising, in component (B) and/or a further component (C), one or more compounds selected from the group consisting of surface-active substances, oxidic boron compounds, phosphorus compounds, carbohydrates, silanes and lithium compounds, where the surface-active substances are preferably selected from the group consisting of anionic surfactants, nonionic surfactants, cationic surfactants, amphoteric surfactants and mixtures thereof, where the oxidic boron compounds are preferably selected from the group consisting of borates, boric acids, boric anhydrides, borosilicates, borophosphates, borophosphosilicates and mixtures thereof, more preferably selected from the group consisting of alkali metal and alkaline earth metal borate, where the oxidic boron compound preferably does not contain any organic groups, where the phosphorus compounds are preferably selected from the group consisting of organic phosphates, inorganic phosphates and mixtures thereof, preferably selected from the group consisting of inorganic alkali metal phosphates, where the carbohydrates are preferably selected from the group consisting of oligosaccharides, polysaccharides and mixtures thereof, preferably selected from the group consisting of cellulose, starch and dextrin, where the silanes are preferably selected from the group consisting of aminosilanes, epoxysilanes, mercaptosilanes, hydroxysilanes, ureidosilanes and mixtures thereof, where the lithium compounds are preferably selected from the group consisting of amorphous lithium silicates, lithium oxides, lithium hydroxide and mixtures thereof.

Correspondingly preferred multicomponent binder systems of the invention are advantageous because they can be used in a particularly uncomplicated and reliable manner to obtain preferred molding material mixtures or molding material mixtures for preferred processes of the invention. In this respect, the above remarks relating to preferred constituents of the molding material mixture for use in accordance with the invention and the respective advantages thereof are correspondingly applicable, mutatis mutandis.

The invention also relates to a molding material mixture comprising
at least components (A) and (B) as defined above
and
as component (D) a refractory mold base material.

Preference is given to corresponding molding material mixtures of the invention because they can be used directly and without further processing steps in a process of the invention and can be processed to give casting molds and cores with excellent breakdown properties and very good regeneratability.

Preference is given to a molding material mixture of the invention (preferably as defined above as preferred), comprising
a regenerated mold base material as refractory mold base material as a constituent of the refractory mold base material, where this regenerated mold base material is preferably producible by a process of the invention.

A corresponding preferred molding material mixture of the invention is advantageous for reasons of sustainability, of conservation of resources and the avoidance of waste, and from an economic point of view.

The particularly preferred configuration wherein the regenerated mold base material is producible by a process of the invention is particularly advantageous because a corresponding regenerated mold base material can achieve the advantages of the process of the invention even in the case of repeated regeneration of the mold base material from the casting molds and cores produced, i.e. even in the case of use of a mold base material recycling system.

Preference is given to a molding material mixture of the invention (preferably as defined above as preferred), wherein
the waterglass has a molar $SiO_2/M_2O$ modulus in the range from 1.6 to 4.0, preferably in the range from 1.8 to 2.5, where $M_2O$ denotes the total amount of lithium oxide, potassium oxide and sodium oxide,
and/or
the mold base material used comprises quartz sand, preferably at least 50% by weight, more preferably at least 80% by weight, of quartz sand, based on the total mass of the mold base material.

Preference is given to corresponding molding material mixtures of the invention because they can be used directly and without further processing steps in preferred processes of the invention. In this respect, the above remarks relating to preferred constituents of the molding material mixture to be used in accordance with the invention and to the respective advantages thereof are correspondingly applicable, mutatis mutandis.

The invention additionally relates to a mold base material mixture comprising
(X) 0% to 99% by weight, preferably 0% to 90% by weight, of novel mold base material
and
(Y) 1% to 100% by weight, preferably 10% to 100% by weight, of regenerated mold base material,
where the percentages are each based on the total mass of the mold base material mixture,
and
wherein the regenerated mold base material (Y)
is producible by a process of the invention.

A corresponding mold base material mixture of the invention is advantageous because it can be used as mold base material in molding material mixtures of the invention and processes of the invention and at the same time comprises at least 1% by weight, preferably at least 50% by weight, more preferably at least 70% by weight, of regenerated mold base material, which is advantageous from the above-described environmental and economical aspects.

A corresponding mold base material of the invention can be used in a process of the invention to produce casting molds and cores that have very good breakdown properties and high regeneratability in turn. In this context, the fact that the casting molds and cores are produced from a mold base material which, in accordance with the invention, already consists at least partly of regenerated mold base material advantageously has only a slight effect, if any, on the strength, breakdown properties and regeneratability of the casting molds and cores produced.

The invention further relates to a casting mold or core,
producible by a process of the invention as defined above
and/or
comprising a mixture of the invention as defined above
and/or
comprising a cured multicomponent binder system of the invention as defined above
and/or
comprising a molding material mixture of the invention as defined above
and/or
comprising a mold base material mixture of the invention as defined above.

Corresponding casting molds or cores of the invention, as elucidated above for the process of the invention, have good strength and particularly advantageous breakdown properties, and high regeneratability. In this respect, the above remarks relating to preferred constituents of the molding material mixture of the invention to be used and to their respective advantages are correspondingly applicable, mutatis mutandis.

The invention additionally relates to the use of an amount of particulate sheet silicates having a $d_{90}$ less than 45 μm or a mixture of the invention as defined above as additive for production of a or as additive for a molding material mixture comprising waterglass and particulate amorphous silicon dioxide, preferably fumed particulate amorphous silicon dioxide, which is cured by chemical reaction of constituents of the molding material mixture with one another,
in the production of a casting mold or core,
to facilitate the breakdown and/or to increase the regeneratability of the casting mold or core. In this respect, the above remarks relating to preferred mixtures of the invention and to their respective advantages are correspondingly applicable, mutatis mutandis. By virtue of the use of the invention, it is possible, as elucidated above for the process of the invention, to obtain casting molds and cores that have good strength and particularly advantageous breakdown properties, and high regeneratability.

Preference is given to a use of the invention (preferably as defined above as preferred), wherein
the waterglass has a molar $SiO_2/M_2O$ modulus in the range from 1.6 to 4.0, preferably in the range from 1.8 to 2.5, where $M_2O$ denotes the total amount of lithium oxide, sodium oxide and potassium oxide, and/or the mold base material used in the production of the casting mold or core comprises quartz sand, preferably at least 50% by weight, more preferably at least 80% by weight, of quartz sand, based on the total mass of the mold base material, and/or in the production of the casting mold or core the curing of the molding material mixture is assisted or brought about by heating the shaped molding material mixture, preferably by heating in a heated mold and/or by gassing with hot air, preferably establishing a temperature in the range from 120 to 180° C. by the heating at least in regions of the shaped molding material mixture, is assisted or brought about by the hydrolysis of an ester, where the ester is preferably selected from the group consisting of ethylene glycol diacetate, diacetin, triacetin, propylene carbonate and γ-butyrolactone, or is assisted or brought about by gassing the shaped molding material mixture with a gas containing less than 1 mol % of $CO_2$.

A corresponding preferred use of the invention is advantageous because the surprising improvement in the breakdown properties and the improvement in the regeneratability of the casting molds and cores produced is manifested particularly clearly in the case of the corresponding use as elucidated above for the process of the invention. With regard to the advantages of the configurations of the use of the invention that are designated as preferred here, the above remarks relating to preferred processes and their respective advantages are correspondingly applicable, mutatis mutandis.

EXAMPLES

There follows a detailed description of the invention by examples.

Examples C1-C5 and I1-I5

1. Compositions and Sample Production:

Firstly, a total of 5 cores of the invention that had been produced by a process of the invention from a molding material mixture of the invention (I1 to I5) were examined, as were five noninventive comparative examples (C1 to C5). The compositions of the respective molding material mixtures from which the corresponding cores were produced are summarized in table 1.

TABLE 1

Composition of the molding material mixtures used.
All values are reported in parts by weight.

| Example | Mold base material[a] | Binder[b] | Additive[c] | Silicate[d] |
|---|---|---|---|---|
| C1 | 100 | 2.2 | — | — |
| C2 | 100 | 2.2 | 1.0 | — |
| C3 | 100 | 2.2 | — | 0.3 (silicate-1) |
| C4 | 100 | 2.2 | 1.0 | 0.3 (silicate-X) |
| C5 | 100 | 2.2 | 1.0 | 0.3 (silicate-Y) |
| I1 | 100 | 2.2 | 1.0 | 0.3 (silicate-2) |

TABLE 1-continued

Composition of the molding material mixtures used.
All values are reported in parts by weight.

| Example | Mold base material[a] | Binder[b] | Additive[c] | Silicate[d] |
|---|---|---|---|---|
| I2 | 100 | 2.2 | 1.0 | 0.3 (silicate-3) |
| I3 | 100 | 2.2 | 1.0 | 0.3 (silicate-4) |
| I4 | 100 | 2.2 | 1.0 | 0.3 (silicate-5) |
| I5 | 100 | 2.2 | 1.0 | 0.3 (silicate-1) |

[a] The mold base material used in each case was quartz sand (coarse foundry silica sand 1K 0,20/0.315/0.40) from Grudzen Las.
[b] The binder used in each case was an alkali waterglass having a molar $SiO_2$:$M_2O$ modulus ($M_2O$ = total amount of $Na_2O$ and $Li_2O$) of 1.95 and a solids content of 35% by weight.
[c] The additive used in each case was a mixture consisting of 95.625 parts by weight of fumed particulate amorphous silicon dioxide (CAS RN 69012-64-2) and 4.375 parts by weight of graphite.
[d] The silicates used in the examples according to table 1 were:
Silicate-1: A calcined particulate sheet silicate having a $d_{90}$ < 45 μm (sourced from Werba-Chem GmbH under the Werbalink ® MK-I trade name);
Silicate-2: A natural particulate sheet silicate (halloysite) having a $d_{90}$ < 45 μm (sourced from Osthoff Omega Group under the Halloysite JM1 mineral pigments trade name);
Silicate-3: A synthetic particulate sheet silicate having a $d_{90}$ < 45 μm (sourced from BYK Additives & Instruments GmbH under the Laponite ® RDS trade name);
Silicate-4: A thermally activated particulate sheet silicate (metakaolin) having a $d_{90}$ < 45 μm (sourced from BASF SE under the MetaMax ® trade name);
Silicate-5: A natural particulate sheet silicate (montmorillonite) having a $d_{90}$ < 45 μm (sourced from Alfa Aesar/Thermo Fischer (Kandel) GmbH under the Montmorillonite K10 trade name).
Silicate-X: A natural island silicate (andalusite) having a $d_{90}$ < 45 μm (sourced from Eggerding B.V. Industrial Minerals under the Andalusite 200 mesh trade name); (N.B.: not a particulate sheet silicate)
Silicate-Y: A natural sheet silicate (montmorillonite) having a $d_{90}$ > 45 μm (sourced from Damolin GmbH under the SorbixUS Premium (0.3-0.7 mm) trade name). (N.B.: $d_{90}$ not less than 45 μm)

The molding material mixtures specified in Table 1 were used, with the aid of a heatable mold for the production of flexural specimens as disclosed in VDG-Merkblatt M11 of March 1974, to produce test specimens by injection. Firstly flexural specimens of dimensions 22.4 mm×22.4 mm×165 mm were produced, which formed the basis for the subsequent studies of flexural strength, and secondly cylindrical test specimens having a height of 50 mm and a diameter of 50 mm, which were used in the determination of the breakdown properties.

For this purpose, the components listed in table 1 were each mixed in a laboratory paddle mixer (from Multiserw). For this purpose, the quartz sand was initially charged and the pulverulent additive and any silicate were mixed in. Then the binder was added. The mixture was subsequently stirred for a total of two minutes. The molding material mixtures were each introduced by means of compressed air (4 bar) into the mold, the core box temperature of which was 180° C. The injection time was 3 s, which was followed by a hardening time of 30 s (delay time 3 s). The curing of the mixtures was accelerated by passing hot air (gassing pressure 2 bar, gassing and gassing hose temperature 150° C.) through the mold for a curing time of 30 s.

2. Determination of Flexural Strength:

Flexural strengths were determined by placing the test bars produced into a Georg Fischer strength tester, equipped with a 3-point bending apparatus (from Multiserw), and the force that led to fracture of the test bars was measured. The flexural strengths were measured 1 hour after removal from the mold (called "cold strength"). The measurements obtained are reported in table 2 under the "Bending resistance" entry as the median from 3 measurements.

3. Examination of Breakdown Properties:

To examine the breakdown properties, the cylindrical test specimens produced with a height of 50 mm and a diameter of 50 mm were subjected to thermal stress in a muffle furnace (from Nabertherm) at a temperature of 900° C. for 10 minutes. After the samples had been removed from the muffle furnace and cooled to room temperature, the test specimens were placed onto an agitated sieve (sieve placed on a vibration shaker, LPzE-3e, from Multiserw) having a mesh size of 1.40 mm and then agitated at the greatest possible amplitude (100% of the maximum possible apparatus setting) for 60 s. In each case, the mass both of the residue on the sieve and of the amount comminuted in the collection tray (broken-down fraction) were determined with a balance. The quotient of the weight of the broken-down fraction to the total mass of the two fractions is referred to as sieve passage and is reported in table 2 under the "Sieve passage" entry as an average from 4 measurements in each case. Improved breakdown properties are especially manifested in high values for sieve passage.

4. Determination of the quality of the regenerated mold base material:

The quality of a regenerated mold base material and its suitability for use in the production of waterglass-bound casting molds and cores having good breakdown properties can be described as good especially when the concentration of water-soluble salts and oxides, especially of water-soluble alkali metal salts and alkali metal oxides, in the regenerated mold base material is particularly low. This property can be examined with the aid of conductivity measurements.

4.1 For each measurement, first of all, a starting solution was produced by introducing 100 mL of ultrapure water into a beaker and adding 0.05 mL of a 1 M KCl solution. The conductivity of the resultant starting solution was determined with a SevenMulti pH/conductivity meter from Mettler Toledo; it corresponds to a blank value.

4.2 The regenerated mold base material was produced in each case by subjecting corresponding flexural specimens of dimensions 22.4 mm×22.4 mm×165 mm to thermal stress in a muffle furnace (from Nabertherm) at a temperature of 900° C. for 5 minutes. After the test specimens had been removed from the muffle furnace and cooled to room temperature, the test specimens were converted to a free-flowing state by manual mechanical action. 50 g of the regenerated mold base material produced in each case, without further processing, were introduced into the beaker containing the starting solution (see 4.1 above), which was then covered with a watchglass. The resultant suspension was heated to 100° C. on a hot plate, left at that temperature for 5 minutes and then cooled down to room temperature. The solids fraction of the suspension was separated off by filtration and the conductivity of the resultant filtrate was determined as described above under 4.1. In table 2, under the "Conductivity" entry, the value found as the average from 4 measurements in each case for the difference between the conductivity determined and the blank value determined beforehand in each case is reported.

4.3 The quality of a regenerated mold base material can also be assessed by the determination of the acid demand (in this regard see the VDG-Merkblatt P26 of October 1999). According to the VDG-Merkblatt P26 of October 1999, the acid demand was determined for selected samples, with production of the regenerated mold base material used as elucidated in 4.2. In table 2, under the "Acid demand" entry, the value found as the average from 4 measurements in each case is reported.

4.4 Measurements and conclusions:

TABLE 2

| | Measurements | | | |
|---|---|---|---|---|
| Example | Flexural strength/ (N/cm$^2$) | Sieve passage/ (%) | Conductivity/ (µS/cm) | Acid demand/ (mg HCl/100 g) |
| C1 | 300 | 8 | 2730 | — |
| C2 | 470 | 52 | 3340 | 213 |
| C3 | 340 | 25 | 1870 | — |
| C4 | 460 | 76 | 2830 | 176 |
| C5 | 440 | 73 | 2100 | — |
| I1 | 520 | 95 | 1130 | 75 |
| I2 | 450 | 100 | 1370 | — |
| I3 | 390 | 100 | 790 | — |
| I4 | 400 | 99 | 1070 | — |
| I5 | 450 | 99 | 1420 | — |

4.4.1 It is apparent from table 2 that the process of the invention can give casting molds and cores having good flexural strengths.

4.4.2 Table 2 shows clearly that, for all the examples produced by the process of the invention, outstanding sieve passages (as a measure of the breakdown properties) of 95% to 100% were measured, all of which are significantly above the sieve passages of 8% to 76% that were ascertained for the comparative examples.

It is found here more particularly that neither the exclusive use of a particulate sheet silicate (example C3, absence of (fumed) amorphous particulate silicon dioxide) nor that of (fumed) particulate amorphous silicon dioxide (example C2, absence of particulate sheet silicate) leads to such a marked increase in the sieve passage as the combinations of the invention (examples I1 to I5). There is a synergistic effect in the inventive examples which becomes particularly clear in that even the combined sieve passage of examples C2 and C3 is only 77% and hence well below the lowest value that was determined for examples I1 to I5.

Furthermore, the comparison of examples I1 to I5 with example C4 shows clearly that an advantageous technical effect results only for particulate sheet silicates, and that, for example, the use of an island silicate such as andalusite (silicate X) leads to considerably poorer sieve passage.

Moreover, the specific comparison of example I4 with example C5 shows that the technical effect results only for particulate sheet silicates having a d90 of the invention, whereas coarser-grain versions of the chemically identical sheet silicate (silicate Y in example C5) result in much poorer sieve passage.

Furthermore, it is clearly apparent that the technical effect of the improved sieve passage is manifested for all the particulate sheet silicates examined (examples 11 to 15), regardless of chemical differences that exist between the particulate sheet silicates used.

4.4.3 The quality of the regenerated mold base materials obtained can additionally be assessed with the aid of the conductivity values, low conductivities being advantageous.

Table 2 shows clearly that low conductivities of 790 to 1420 µS/cm have been measured for all the examples produced by the process of the invention, all of which are significantly below the high conductivities of 1870 to 3340 µS/cm that were ascertained for the comparative examples.

It is found here that neither the exclusive use of a particulate sheet silicate (example C3, absence of (fumed) amorphous particulate silicon dioxide) nor that of (fumed) particulate amorphous silicon dioxide (example C2, absence of particulate sheet silicate) leads to such a marked decrease in conductivity as the combination of the invention (examples I1 to I5). More particularly, the exclusive use of (fumed) particulate amorphous silicon dioxide (example C2), as compared with example C1 (no amorphous silicon dioxide; no silicate), actually results in a rise in conductivity, which makes the synergistic effect of the combination of the invention (examples I1-I5) particularly clear.

Moreover, the comparison of examples I1 to I5 with examples C4 and C5 shows clearly that this advantageous technical effect also results only for particulate sheet silicates, especially particulate sheet silicates that have a d90 of the invention, whereas the use of an island silicate (C4; silicate-X), just like the use of a coarser-grain version of a sheet silicate (C5, silicate-Y), leads to an unfavorably high conductivity value.

Furthermore, it is clearly apparent that the technical effect of the improved screen passage is manifested for all the particulate sheet silicates examined (I1 to I5), regardless of the chemical differences that exist between the compounds used.

4.4.4 Consideration of the measurements of acid demand that are compiled in table 2 makes it clear that the acid demand can be correlated directly with the conductivities discussed above under 4.4.3, and that the conductivity also decreases with the acid demand.

4.4.5 Beyond the measurements compiled in table 2, it has been found in in-house studies that a physical removal (sieving) of the dust fraction <125 μm of the regenerated mold base materials, in the case of molding material mixtures of the invention (examples I2 and I3), leads to a further decrease in conductivity by 10% to more than 20%. In the case of a noninventive mixture (example C2), by contrast, only a decrease in conductivity by about 5% was found after the removal.

5. Further studies:

Studies were additionally conducted on cores that were produced using molding material mixtures of the invention or comparative molding material mixtures. The constituents of the molding material mixtures are first assigned abbreviations in table 3. According to table 4, the cores examined are classified into groups according to their constituents and assessed qualitatively with regard to their strength, breakdown properties and regeneratability.

TABLE 3

Constituents of the molding material mixtures used in the process.

| Abbreviation | Constituent |
|---|---|
| A | Mold base material |
| B | Solution or dispersion comprising waterglass |
| C | 0.1% to 3% by weight of (fumed) particulate amorphous silicon dioxide |
| D | 0.05 to 1.5% by weight of island silicate |
| E | 0.05 to 1.5% by weight of sheet silicates, $d_{90}$ > 45 μm |
| F | 0.05 to 1.5% by weight of particulate sheet silicates, $d_{90}$ < 45 μm |

TABLE 4

Qualitative assessment of the cores produced from the molding material mixtures used with regard to strength, breakdown properties and regeneratability.

| No. | Constituents of the molding material mixture | Strength | Breakdown | Regeneratability |
|---|---|---|---|---|
| 1 | A + B | – – | – – | – – |
| 2 | A + B + C | + + | – | – – |
| 3 | A + B + F | – | – – | + |
| 4 | A + B + C + D | + + | + | – – |
| 5 | A + B + C + E | + | + | – |
| 6 | A + B + C + F | + | + + | + + |

The symbols here have the following meanings:
(– –) = very poor,
(–) = comparatively poor,
(+) = good and
(+ +) = very good.

The qualitative assessment in table 4 demonstrates that very good breakdown properties and very good regeneratability are observed only for molding material mixtures or cores of the invention (No. F) and that good strength is simultaneously observed for these.

The invention claimed is:

1. A process for producing casting molds, cores and mold base materials regenerated therefrom, comprising the following steps for production of a casting mold or a core:
   providing or producing a molding material mixture comprising
   a mold base material
   a solution or dispersion comprising waterglass
   0.1% to 3% by weight of particulate amorphous silicon dioxide
   and, to facilitate the breakdown and/or to increase the regeneratability of the casting mold or the core,
   one or more particulate sheet silicates in a total amount of 0.05% to 0.4% by weight, where the $d_{90}$ of the total amount of the sheet silicates is less than 45 μm,
   where the percentages are each based on the total mass of the molding material mixture,
   shaping the molding material mixture,
   curing the molding material mixture by chemical reaction of constituents of the molding material mixture with one another, so as to result in the casting mold or the core.

2. The process as claimed in claim 1, wherein the waterglass in the molding material mixture has a modular $SiO_2/M_2O$ modulus in the range from 1.6 to 4.0, where $M_2O$ denotes the total amount of lithium oxide, sodium oxide and potassium oxide.

3. The process as claimed in claim 1, wherein the average diameter of the mold base material particles is in the range from 100 μm to 600 μm.

4. The process as claimed in claim 1, wherein the molding material mixture comprises fumed particulate amorphous silicon dioxide and/or the particulate amorphous silicon dioxide is a fumed particulate amorphous silicon dioxide.

5. The process as claimed in claim 1, wherein the one or more particulate sheet silicates are present in the molding material mixture in a total amount of 0.1% to 0.4% by weight, where the $d_{90}$ of the total amount of the sheet silicates is less than 45 μm.

6. The process as claimed in claim 1, comprising the providing or producing of a molding material mixture comprising a mold base material, a solution or dispersion comprising waterglass, one or more particulate sheet silicates in a total amount of 0.1% to 0.4% by weight, where the $d_{90}$ of the total amount of the sheet silicates is less than 45 μm, 0.3% to 3% by weight, of particulate amorphous silicon dioxide, and 0.01% to 1% by weight of graphite, where the percentages are each based on the total mass of the molding material mixture.

7. The process as claimed in claim 1, wherein the mold base material comprises quartz sand, and/or wherein the curing of the molding material mixture is assisted or brought about by heating the shaped molding material mixture, is assisted or brought about by the hydrolysis of an ester, where the alcohol is selected from the group consisting of C1-C8 monoalcohols, C1-C8 dialcohols, and C1-C8 trialcohols, and the acid is selected from the group consisting of organic C2-C8 monocarboxylic acids, organic C2-C8 dicarboxylic acids, organic C2-C8 tricarboxylic acids, or is assisted or brought about by gassing of the shaped molding material mixture with a gas or gas mixture containing less than 1 mol % of $CO_2$.

8. The process as claimed in claim 1, wherein the casting mold produced or the core produced is heated temporarily at least in regions to a temperature of >900° C. such that the breakdown is subsequently facilitated, and/or wherein the casting mold produced or the core produced is heated temporarily at least in regions, by contacting with a metal melt in the casting operation, to a temperature of >900° C. such that the breakdown is subsequently facilitated.

9. The process as claimed in claim 8 for production of a regenerated mold base material from the casting mold produced or the core produced after the heating, comprising the following additional steps:

acting mechanically on the casting mold produced or the core produced, such that the casting mold or core breaks down, producing the regenerated mold base material from the broken-down casting mold or the broken-down core.

10. The process as claimed in claim 1, wherein the molding material mixture provided or produced contains a proportion of regenerated mold base material produced from a casting mold produced or a core produced after a heating, comprising the following additional steps:

acting mechanically on the casting mold produced or the core produced, such that the casting mold or core breaks down, producing the regenerated mold base material from the broken-down casting mold or the broken-down core and/or wherein the shaping of the molding material mixture and/or the curing of the molding material mixture is effected by means of a 3D printer and/or wherein the shaping of the molding material mixture is effected in a 3D printing method and the curing of the molding material mixture is effected during the 3D printing operation and/or after the 3D printing operation.

\* \* \* \* \*